United States Patent [19]

Silva, Filho

[11] Patent Number: 4,923,507

[45] Date of Patent: May 8, 1990

[54] PROCESS FOR OPENING ORES

[75] Inventor: Egberto Silva, Filho, Sao Paulo, Brazil

[73] Assignee: Mamore Mineracao E Metalurgia S/A, Sao Paulo, Brazil

[21] Appl. No.: 195,844

[22] Filed: May 19, 1988

[30] Foreign Application Priority Data

Jul. 20, 1987 [BR] Brazil .............................. PI 8703766

[51] Int. Cl.$^5$ ............................................... C22B 1/00
[52] U.S. Cl. ....................................... 423/68; 423/492; 423/490; 423/489; 423/84; 423/72; 423/63
[58] Field of Search ............... 75/2, 101 R, 115, 65 R, 75/67 R, 84, 84.4, DIG. 3, 21, 23, 93 R; 423/63, 68, 72, 84, 492, 489, 490

[56] References Cited

U.S. PATENT DOCUMENTS

| | | | |
|---|---|---|---|
| 3,930,842 | 1/1976 | Ryss et al. | 75/10.39 |
| 3,972,710 | 8/1976 | Meyer | 423/68 |
| 3,976,475 | 8/1976 | Markland | 423/63 |
| 4,058,393 | 11/1977 | McLaughlin | 423/84 |
| 4,302,243 | 11/1981 | Tamaru et al. | 423/66 |
| 4,309,389 | 1/1982 | Meyer | 423/63 |
| 4,446,116 | 5/1984 | Krismer et al. | 423/63 |
| 4,451,438 | 5/1984 | Floeter et al. | 423/68 |
| 4,673,554 | 6/1987 | Niwa et al. | 423/63 |

FOREIGN PATENT DOCUMENTS 55-113807  9/1980  Japan .

OTHER PUBLICATIONS

S. L. May et al., "Separation of Tantalum From Columbium by the Hydrofluoric Acid Sulfuric Acid-Methyl Isobutyl Ketone System", (1961), pp. 1-31.
Joseph R. Werning et al., "Tantalum and Niobium—Separation by Liquid-Liquid Extraction", Industrial & Engineering Chemistry, (1954), pp. 2491-2494.

*Primary Examiner*—Robert L. Stoll
*Assistant Examiner*—Paige C. Harvey
*Attorney, Agent, or Firm*—Beveridge, DeGrandi & Weilacher

[57] ABSTRACT

The subject of the invention is a process for opening ores, particularly ores containing tantalum, niobium, zirconium and titanium, of the kind that includes the stages of leaching with mineral acids, solvent extraction, purification and separation of the products obtained, characterized by the fact that initially, instead of leaching with sulfuric acid and hydrofluoric acid being performed as a first stage, the original ore concentrate is melted together with fluorite ($CaF_2$), followed by milling of the melting product obtained and subsequently leaching with concentrated sulfuric acid, followed by extraction of the soluble species using solvents, separation and purification of the products obtained.

15 Claims, No Drawings

PROCESS FOR OPENING ORES

BACKGROUND OF THE INVENTION

The present invention refers to an improved process for opening ores, particularly ores containing tantalum, niobium, zirconium and titanium, in which, instead of the usual initial leaching using sulfuric acid ($H_2SO_4$) and hydrofluoric acid (HF) for opening ore, the original ore concentrate is initially melted with fluorite ($CaF_2$), followed by other usual known stages, so that compounds of the desired metals are obtained in much shorter reaction times and without environmental pollutio with hydrofluoric acid as a process effluent.

The usual state of the art processes for opening ores, particularly ores containing Tantalum (Ta), Niobium (Nb), Zirconium (Zr) and Titanium (Ti) include leaching with sulfuric acid and hydrofluoric acid, as described in the following literature: (1) May, S. L., Tews, J. L., and Goff, T. N., "Separation of Tantalum from Columbium by hydrofluoric acid-sulfuric acid-methyl isobuthyl-Ketone System, Report of Investigations 5862 Bureau of Mines U.S.A. 1961; (2) Werning J. R. and Higbie H. B., Tantalum and Niobium separation by liquid-liquid extraction", *Industrial and Engineering Chemistry*, Vol. 46, No. 12, Dec. 1954, pgs. 2491-2494; and (3) *Solvent Extraction Principles and Application*, by G. M. Ritey and A. W. Ashbrook, Vol. 2 (1979), pgs. 363-370, Chapter 4.11. In these processes an aqueous solution of mixtures of HF and $H_2SO_4$ is prepared containing 20 to 30% of each acid from concentrated acids, after which the ore is slowly added.

The operation is carried out in a stirred reactor which is usually lined with graphite. The addition of ore must be done slowly because of great heat generation (strongly exothermic reaction), which would cause excessive loss of HF.

The purpose of this process step, which is also known as "opening the ore" is to form the following soluble species: $H_2TaF_7$—$H_2NbOF_5$—$H_2TiF_6$—$H_2ZrF_6$. Reaction time is approximately 48 hours. After this, free steam is injected into the reaction medium to raise the temperature to approximately 80° C., which helps in the following stage of pulp filtration. The filtrate is then transferred to the liquid-liquid extraction plant and the solid residue is disposed of.

The major drawbacks of these state of the art processes for opening ores containing Ta and Nb are:

(1). Method of operation

The traditional method of acid leaching of ore containing Ta, Nb, Zr, Ti is a batch process which normally is a less efficient operation than a continuous process, and also requires more equipment and greater size thus increasing initial investment considerably.

(2) Reaction time:

A reaction time of 48 hours implies more and larger equipment and thus increases initial investment.

(3) Effluent treatment:

After the Ta and Nb coextraction stage, a large amount of liquid effluent with a high concentration of HF and $H_2SO_4$ is generated, requiring elaborate and costly treatment of this effluent prior to disposal.

This prior art method of treatment also uses a large quantity of hydrofluoric acid, whichis an expensive reagent. This further adds to the cost of the process.

OBJECTIVES OF THE INVENTION

It is an objective to provide a novel and economic process for the preliminary treatment of materials such as ores (e.g., columbite) containing tantalum, niobium, titanium, and zirconium, for the recovery of these elements. This preliminary treatment is often referred to as "opening of the ore" and involves producing soluble species suitable for further processing to recover the above-mentioned elements.

It is a further objective of the invention to provide an improved process which eliminates the above-mentioned drawbacks.

These and other advantages and objectives of the invention will become obvious from the following detailed description of the invention.

DETAILED DESCRIPTION OF THE INVENTION

It has now been proved that surprisingly the above mentioned drawbacks can be eliminated by means of an improvement introduced into state of the art techniques, as described below, in the following stages:

(a) Melting of the ore:

The most significant novelty of the invention is the use of a melting stage, whereby the ore containing tantalum, niobium, zirconium and/or titanium is melted along with calcium fluoride (fluorite, $CaF_2$). This takes place in a high temperature furnace. A slag containing reactive species of Ta, Nb, Zr and Ti is formed.

The ore is initially melted with fluorite ($CaF_2$) in the stochiometric amount necessary for reacting with the Ta, Nb, Zr and Ti oxides which are present in the ore. The reaction temperature lies within the approximate range of 1000° C. and 2000° C., particularly 1200° to 1600° C.

After the ore has been melted with fluorite, a slag is obtained which contains mainly Ta, Nb, Zr, Ti and fluorite.

Since the ore's Fe and Sn content is high, carbothermal reduction may be carried out during the melting stage, thus forming a Fe-Sn alloy which is separated out of the slag due to difference in density.

(b) Milling of slag

The slag is preferably crushed first to a particle size 100% less than 1.27 cm (0.5") and then milled right away, preferably in a ball or rod mill, down to an appropriate particle size and treated, after which it enters the leaching stage.

(c) Leaching:

The milled slag is transferred to a mixer where it reacts with concentrated (96-98%) sulfuric acid ($H_2SO_4$).

The quantity of added $H_2SO_4$ is necessary to complete the reaction with the fluorite present in the slag and to obtain gypsum ($CaSO_4$) as the reaction product and fluorides of the metals sought, such as, for example, $H_2TaF_7$, $H_2NbF_7$ or $H_2NbOF_5$, $H_2ZrF_6$ and $H_2TiF_6$, plus an excess of 5%. These fluorides are species that are soluble in $H_2O$ and certain organic solvents. Residence time in the mixer is of a few minutes and the process is carried out at ambient temperature.

The sludge that is formed in th mixer is then discharged into a specific reactor where the reaction is completed. As the reaction is exothermic, the final temperature is approximately 60°-80° C. The mixer is provided with a gas exhaust system for the purpose of gathering the silicon fluoride ($SiF_4$) that is formed, which is then transferred to the gas scrubbing system for the production of silicic acid (Si(OH)$_4$) and fluorosilicic acid (H$_2$SiF$_6$).

The final reaction product is a solid mass composed of a CaSO$_4$ matrix and containing soluble species of Ta, Nb, Ti and Zr.

Retention time in the mixer is a few minutes.

(d) Liquid-solid extraction:

The mass of CaSO$_4$ obtained in the leaching stage is contacted, in another reactor, with solvent for the purpose of extracting Ta, Nb, Zr and Ti.

This operation can be carried out in any kind of equipment that allows mixing and separation of a solid and a liquid provided that it shall be impermeable to solvent volatilization.

The operation is carried out at ambient temperature.

Solvent flow should be sufficient to obtain an appropriate concentration of Tantalum and Niobium oxides for the solvent being used.

The equipment should be provided with a gas exhaust system and the gases should run through a condenser for maximum recovery of volatized solvent, where applicable.

Following this operation, the organic phase (solvent containing Ta and Nb is transferred to the purification and separation unit.

The following advantages are obtained with the process of the invention as compared with known processes:

(1) Reaction time:

While in the known processes the leaching stage takes approximately 36 to 48 hours, in the process of the present invention this stage is approximately only 10 minutes, which permits the operation to be carried out using smaller size equipment for the same production capaeity.

(2) Method of operation:

In the known processes, leaching is a batch operation, while in the present operation the operation can be continuous which again permits the use of smaller and more efficient equipment, thus reducing investment enormously.

(3) Kind of ore:

The process of the invention, due to the use of fluorinate instead of hydrofluoric acid in attacking the ore, makes the operation economically feasible for processing ores with a low tantalum and niobium content.

(4) Pollution:

(a) Atmospheric:

The non-use of concentrated hydrofluoric acid as a leaching agent permits an operation that is free of atmospheric pollution, since HF is a large and serious source of pollution, which requires complicated, costly and dangerous handling.

(b) Environmental:

The major effluent of the process of the invention is a residual solid of the liquid-solid extraction stage consisting basically of CaSO$_4$ which can be easily stored as fill. As a precaution, this effluent can be mixed with neutralizing agents such as, for example, calcium carbonate or oxide in order to neutralize any traces of the acid solution. Thus the present invention does not involve any liquid, highly acid effluent such as, for example, a solution of approximately 13N of HF+H$_2$SO$_4$ which is difficult to treat using the usual procedures.

The precipitation residues of Ta and Nb may be re-used for the recovery of CaF$_2$ by reacting with CaSO$_4$ for production of ammonium sulfate ((NH$_4$)$_2$SO$_4$).

(5) Liquid-solid extraction:

This operation replaces the stage of known extraction/separation processes with the advantage of entraining less impurities into the cleaning stage and using simpler equipment.

The invention is explained below in more detail by means of an example which should in no way limit the invention, but only illustrate it.

Example

Columbite as used as starting ore

Melting

About three tons of ore were melted together with CaF$_2$ in an electric furnace at a temperature of approximately 1500° C.

Chemical analysis of the ore was the following:

| | |
|---|---|
| Nb$_2$O$_5$ = | 27.1% |
| Ta$_2$O$_5$ = | 21.2% |
| Fe$_2$O$_3$ = | 16.4% |
| TiO$_2$ = | 11.7% |
| ZrO$_2$ = | 0.5% |
| SiO$_2$ = | remaining difference (7.6%) |
| SnO$_2$ = | 14.6% |

For every 100 kg of ore, 321 kg of fluorite were used. Furnace capacity was 100 kg of liquid load and melt was poured every 2 hours.

Milling

Pre-crushing was effected to obtain a particle size 100% under ¼" (0.64 cm). Then the slag was milled in a roller mill down to 100% less than 200 mesh.

Fines were separated out using an air separator and the gross fraction was returned to the mill.

Leaching

This stage was carried out on a double axle spiral conveyor, with a length of 3.0 meters and a diameter of 0.5 meters, 10 pitches, at 2 rpm.

To each 100 kg of slag there were added 95.5 kg of 98% H$_2$SO$_4$.

The reagents entered at ambient temperature and at the end of the reaction product temperature was about 60° C.

The time required to form the solid gypsium (CaSO$_4$) was approximately 4 minutes.

Liquid-solid extraction

The mass obtained by attacking the slag with H$_2$SO$_4$ was then placed in countercurrent with the solvent methylisobutylketone in order to determine the degree of extraction of tantalum and niobium oxides. This operation was carried out in stirred tanks (300 rpm) which were internally lined with polypropylene. The tank capacity was 1000 liters and the solid mixture with the addition of methylisobutylketone normally occupied 600 liters.

Extraction temperature was ambient temperature. It was found that for a 7-stage operation Ta$_2$O$_5$ extraction efficiency was approximately 95% and for Nb$_2$O$_5$ this was about 90%. The only impurity present in the organic solution was TiO$_2$ (about 1.5%), which is a significant datum, since the input ore contains 16% Fe$_2$O$_3$, 14% SnO$_2$ and 12% TiO$_2$.

Another important fact is that after the separation and purification stages, the products obtained preserved the same degrees of purity that are obtained with conventional processes.

What is claimed:

1. Process for opening of ores, wherein said ore includes at least one of the metals from the group consisting of tantalum, niobium, zirconium and titanium, said process comprising the steps of:
   (a) melting said ore with fluorite ($CaF_2$) to produce a slag;
   (b) milling said slag; and
   (c) leaching the milled slag using sulfuric acid to give a solid product containing a soluble species of the metal or metals contained in the ore.

2. Process as defined in claim 1, wherein the ore and the fluorites melts within a temperature range of approximately 1000° to 2000° C.

3. Process as defined in claim 1, wherein the leaching takes place in a continuous manner.

4. Process as defined in claim 1, further including the step of:
   (d) solid-liquid extraction of the solid product from the leaching step using a solvent, to obtain oxides of the metal or metals contained in the ore.

5. Process as defined in claim 4, further including the step of:
   (e) separation of the metal oxides obtained from the solid-liquid extraction.

6. Process as defined in claim 5, further including the step of:
   (f) purification of the metal oxides obtained from the separation step.

7. Process as defined in claim 1, wherein the ore and the fluorite melts within a temperature range of approximately 1200° to 1600° C.

8. Process as defined in claim 1, wherein in the milling step, the slag is crushed to a particle size of 1.27 cm or less.

9. Process as defined in claim 1, wherein the sulfuric acid concentration is in the range of 96–98% sulfuric acid.

10. Process as defined in claim 1, wherein the soluble species is at least one of the group consisting of: $H_2TaF_7$, $H_2NbF_7$, $H_2NbOF_5$, $H_2ZrF_6$ and $H_2TiF_6$.

11. Process as defined in claim 1, wherein the ore is columbite.

12. Process as defined in claim 1, wherein in the milling step, the slag is crushed to a particle size of 0.64 cm or less.

13. Process as defined in claim 4, wherein the extraction step uses an organic solvent.

14. Process as defined in claim 13, wherein the solvent is methyl isobutyl ketone.

15. Process as defined in claim 4, wherein the solid-liquid extraction is carried out in a countercurrent process.

* * * * *